(12) United States Patent
Vaughan

(10) Patent No.: US 6,229,482 B1
(45) Date of Patent: May 8, 2001

(54) METHOD AND APPARATUS FOR INTERFERENCE MITIGATION FOR PHASED-ARRAY BEAM POINTING

(75) Inventor: Robert E. Vaughan, Redondo Beach, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/550,577

(22) Filed: Apr. 17, 2000

(51) Int. Cl.$^7$ .................................................. H04B 7/185
(52) U.S. Cl. ............................................. 342/379; 342/354
(58) Field of Search .................................. 342/154, 352, 342/354, 379

(56) References Cited

U.S. PATENT DOCUMENTS 4,792,813 * 12/1988 Rosen ................................. 343/781 P
4,827,268 * 5/1989 Rosen ................................. 342/368

* cited by examiner

Primary Examiner—Thomas H. Tarcza
Assistant Examiner—Dao L. Phan
(74) Attorney, Agent, or Firm—T. Gudmestad

(57) ABSTRACT

A method and apparatus for determining interference from a beam generated by a satellite includes the steps of determining a desired beam having a desired center location, a desired shape, a beam angle, and a predetermined frequency bandwidth comprising a plurality of frequencies. An acceptable interference is determined according to an acceptable side lobe signal strength. A beam squint pattern is determined that corresponds to each of the frequency widths. A beam squint boundary has an area substantially enclosing the beam squint pattern. The beam squint pattern has a center and a radius. A distance between centers is determined based upon the radii of the adjacent beams.

16 Claims, 3 Drawing Sheets

US 6,229,482 B1

METHOD AND APPARATUS FOR INTERFERENCE MITIGATION FOR PHASED-ARRAY BEAM POINTING

TECHNICAL FIELD

The present invention relates to satellite communications, and more particularly to a satellite and method for forming beams to prevent interference from adjacent beams on the satellite.

BACKGROUND ART

When generating beam coverage patterns for a particular landmass, it is necessary to prevent interference from multiple radiated beams. This is particularly important when using a phased-array antenna system in which the beams are directed by phase shifters on each array element. Before generating each beam, an interference check must be performed so that the desired beam does not interfere with another beam that is being generated.

In a time-division multiple-access (TDMA) scheduling system, an interference check is commonly an integral portion of the TDMA scheduling algorithm.

In known beam interference check methods, one particular frequency, called the steering frequency $f_o$, is chosen to be the frequency for which interference is checked. Commonly, the steering frequency is the center of the operating bandwidth of the signal to be transmitted or received. The phase shifts for each element given a steering direction ($u_o, v_o$) are calculated as: $\phi_{m,n} = (2\pi/\lambda_o) d_u m u_o + (2\pi/\lambda_o) d_v n v_o$ with $\lambda = c/f_o$, $d_u$ and $d_v$ is the inter-element spacings in u and v coordinate directions and for a given element location m,n. Other frequencies not equal to $f_o$ are derived by the ratio $f/f_o$ where f is the desired frequency.

One problem with the prior known method is that over a particular frequency width that is used for transmission, a phenomenon known as "beam squint" takes effect. For the operating frequency bandwidth, the circle footprints generated by the satellite beams from a particular phased-array element are slightly skewed from each other. That is, the position of beam at a frequency at the low end of the bandwidth will vary from the beam position of a beam at the high end of the bandwidth. Because beam squint is not taken into effect, undesirable interference may occur between beams generated from adjacent phased array elements.

SUMMARY OF THE INVENTION

It is, therefore, one object of the invention to provide a more accurate beam interference check method by taking beam squint into consideration.

In one aspect of the invention, a method of generating beams includes the steps of determining a desired beam having a desired center location, a desired shape, a beam angle, and a pre-determined frequency bandwidth comprising a plurality of frequencies. An acceptable interference is determined according to an acceptable side lobe signal strength. A beam squint pattern is determined that corresponds to each of the frequency widths. A beam squint boundary has an area substantially enclosing the beam squint pattern.

The beam squint pattern has a center and a radius. The distance between centers is determined based upon the radii of adjacent beams.

Other objects and features of the present invention will become apparent when viewed in light of the detailed description of the preferred embodiment when taken in conjunction with the attached drawings and appended claims.

BEST MODE(S) FOR CARRYING OUT THE INVENTION

Figure 1:
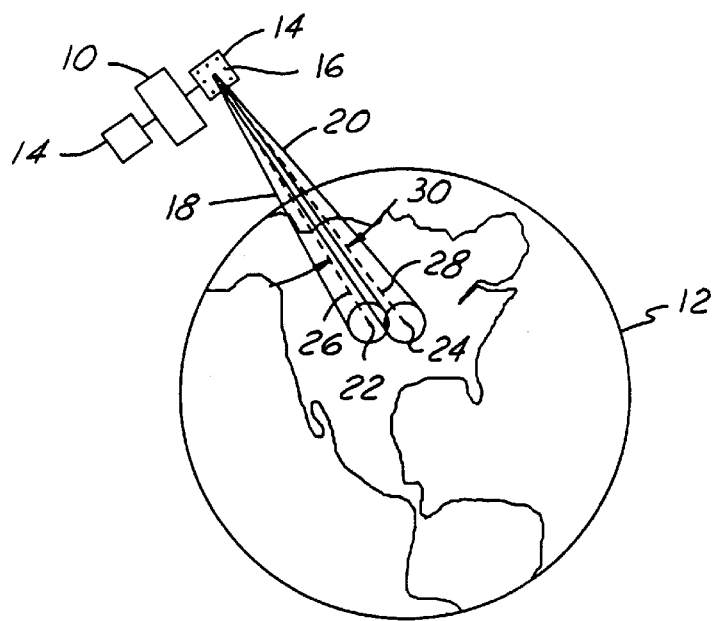
FIG. 1 is a perspective view of a satellite projecting beams onto the earth with reduced interference according to the present invention.

Referring to FIG. 1, a satellite 10 is illustrated above the earth 12. Satellite 10 may be any type of satellite such as a low earth orbit satellite (LEO), a medium earth orbit satellite (MEO), or a GEO stationary satellite (GSO). As will be evident to those skilled in the art, the present invention is particularly applicable to LEO and MEO satellites due to the higher scan angles.

Satellite 10 has computer based controller 13, an antenna 14 that has a number of antenna elements 16. Controller 13 controls the command, control and tracking of satellite 10. As will be further described below, controller 13 may perform functions for calculating beam angles and interference between potential satellite beams.

Antenna 14 is a phased-array antenna having a plurality of circular or square apertures as part of antenna element 16. Antenna elements 16 generate a plurality of beams that may be used for transmitting and receiving radio frequency (RF) satellite information. For simplicity, only two beams have been illustrated; a bore sight or broadside beam 18 and a non-bore sight beam 20. Satellite 10 preferably generates a number of beams 20 that are used to provide satellite communication service. Each beam 18, 20 has a respective center 22, 24 when projected onto Earth 12. Each beam 18, 20 has a respective longitudinal axis 26, 28. The beam angle of broadside beam 18 is defined as zero degrees since broadside beam 18 is projected straight down onto the surface of earth 12. Beam 20 has a scan angle 30 that is defined between longitudinal axis 26 of broadside beam 18 and longitudinal axis 28 of beam 20.

Both beams 18, 20 have a predetermined shape determined by the shape of the antenna aperture. Commonly, the beams are circular or elliptical in shape. Beams 18, 20 also have a frequency bandwidth associated therewith. The operating bandwidth is commonly centered around such frequencies as X-band, K-band, or Ka-Band.

The present invention is particularly applicable to an antenna element 16 that uses phase-only steering. That is, by changing the phase of the signal generated by each antenna element, the longitudinal axis 26, 28 may be positioned to a desired scan angle 30 to position centers 22, 24 of beams 18, 20.

Figure 2:
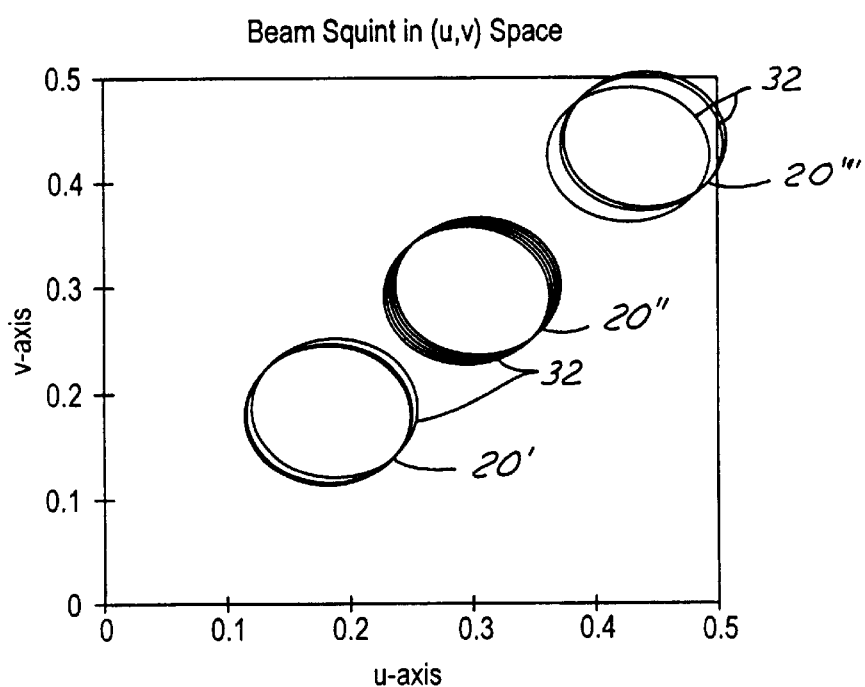
FIG. 2 is a graphical representation of three side lobe contours at three scan angles with five frequencies plotted at each scan angle.

Referring now to FIG. 2, a plurality of beams 20a, 20b, and 20c are illustrated. Each of the beams 20a, 20b, and 20c are off-broadside beams. Beam 20a is 15° off-broadside; beam 20b is 25° off-broadside; and beam 20c is 38° off-broadside.

The problem of beam squint is illustrated by the figure. Five frequencies are plotted for each beam 20a, 20b, and 20c although some plots nearly overlap. Each beans has a plurality of contours 32 associated therewith. Each of the contours 32 represents a frequency over the frequency bandwidth of each of the beams. As illustrated, the distance between the low frequency contours and high frequency contours increases as the scan angle increases.

Figure 3:
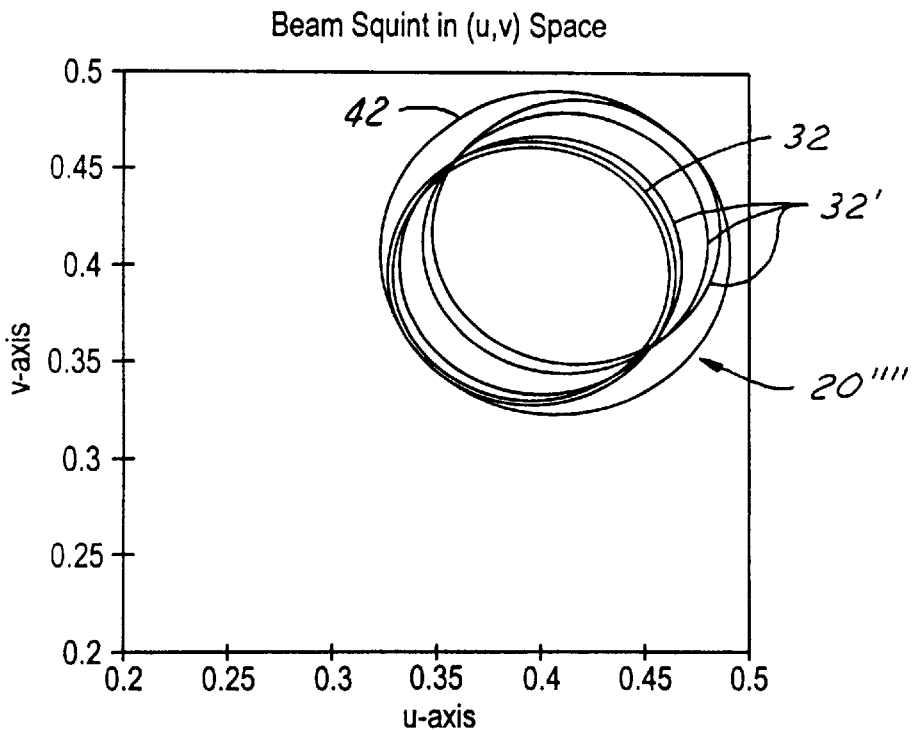
FIG. 3 is a plot of a 35° scan angle beam squint having a high frequency circular region, a low frequency circular region, and a beam squint boundary formed according to the present invention.

Referring now to FIG. 3, a beam 20d having a scan angle of 35° is illustrated. Five contours 32° are illustrated. A contour 36 corresponds to a low frequency within the bandwidth of beam 20d. A high frequency contour 38 corresponds to a high frequency within the bandwidth of beam 20d. In known satellite systems, beam squint is not compensated for when determining interference. In the present invention, a beam squint boundary 42 is used to determine interference with other beams. Beam squint boundary 42 has an area that substantially encloses all of the contours corresponding to the frequency bandwidth.

Figure 4:
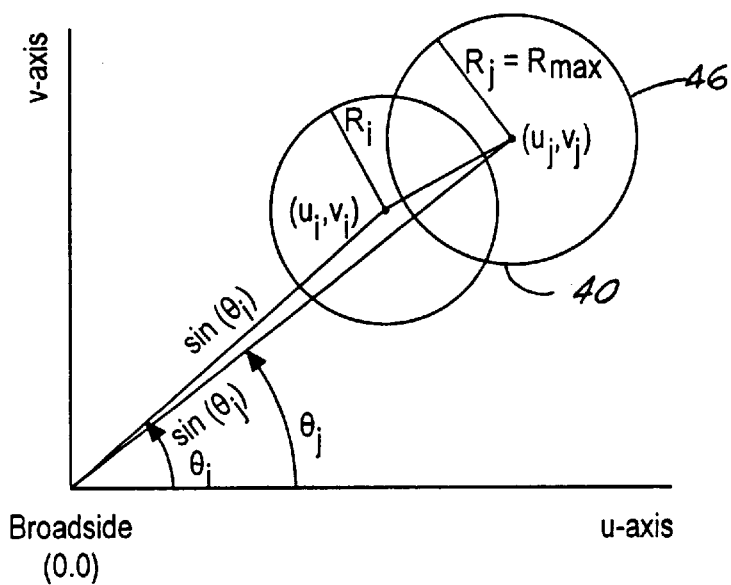
FIG. 4 it is a plot of two beam squint boundaries spaced to prevent interference according to the present invention.
Figure 5:
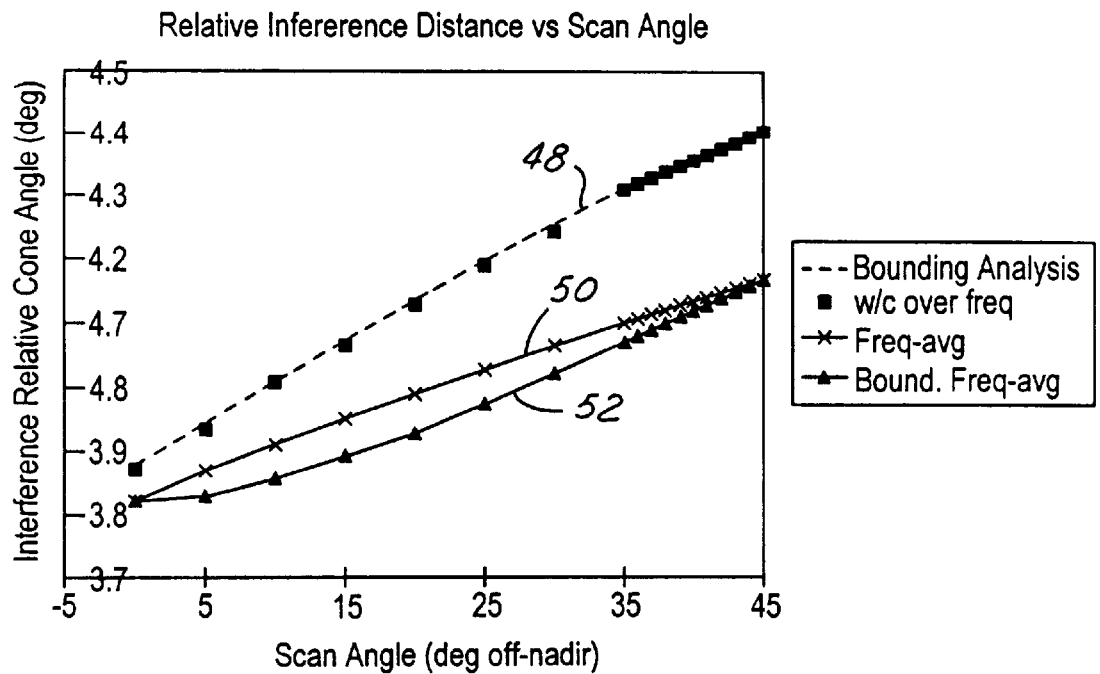
FIG. 5 is a plot of interference distance versus scan angle using the three methods cf the present invention.

Referring now to FIGS. 4 and 5, for all the following examples, it is presumed that the coordinates (u, v) and the radius $R_0$ is chosen such that a low enough side lobe signal levels are present at $R_0$ from he beam center. Ro corresponds to the beam squint boundary for all the frequency bandwidth. That is, for all coordinates u, v, where $u^2 + v^2 > R_0^2$ are below a desired side lobe level which yields an acceptable self-interference level in the performance of the RF link. The $\Delta$ corresponds to the distance between the centers of the beam. A suitable $\Delta$ value has a relation to the longest radius of the beams being compared. In the following equations, a suitable A must be determined between adjacent beams. In general, a beam squint boundary with a radius is determined for the beams and the distance between the centers of the beams is compared.

As is shown in FIG. 5, the actual sum angle to relative cone angle plot is shown as line 52. Line 52 is not a straight line and therefore a linear approximation is not perfectly accurate. The following two method approximates this line as line 48 for method 1 and line 50 for method 2.

The first method is a linear approximation of line 52. In the first method, the first beam 44 has center coordinates of $(u_i, v_i)$ where the broadside beam represents coordinate (0,0). A second beam 46 has center coordinate of $(u_j, v_j)$. To determine a suitable A value, the following parameters and equations are used:

Parameters:

$R_0$=the angular radius of the desired sidelobe level, in radians, for an array beam steered at broadside $\alpha_{max}$=ma),[f/f_0] for all f within the operating bandwidth shown by the slope of line 48 of FIG. 5; $f_0$=steering frequency of array phase shifters $\delta_1$=max[f/f_0] for all f within the operating bandwidth; $f_0$=steering frequency of the array phase shifters; for a first beam $\delta_2$=min[f/f_0] for all f within the operating bandwidth; $f_0$=steering frequency of the array phase shifters; for a second beam Single Beam's Sidelobe Radius:

$$R(\theta)=\sin^{-1}[(\alpha_{max}-1)\sin(\theta)+\alpha_{max}\sin(R_0)]$$

for R as an angle in radians. Actual (u, v) radius checked is $$R_{uv}=[(\alpha_{max}-1)\sin(\theta)+\alpha_{sin}(R_0)].$$

The following equations are used for a multiple beam pointing check:

Beams i and j can only be pointed to locations $(u_i, v_i)$ and $(u_j, v_j)$ such that:

$$\sin(\theta_i)=sqrt(u_i^2+v_i^2)$$

$$\sin(\theta_j)=sqrt(u_j^2+v_j^2)$$

$$R_i=[(\alpha^{max}-1)\sin(\theta_i)+\alpha_{max}\sin(R_0)]$$

$$R_j=[(\alpha^{max}-1)\sin(\theta_j)+\alpha_{max}\sin(R_0)]$$

Where $R_i$ and $R_j$ corresponded to the beam squint boundary.

The following conditions must be satisfied to obtain a suitable $\Delta$ distance.

$$(u_i-\delta_1 u_j)^2+(v_i\delta_1 v_j)^2>R_j^2 \text{ and } (u_j-\delta_2 u_j)^2+(vj_j-\delta_2 v_i)^2>R_j^2$$

If the following conditions are obtained, then a minimum suitable $\Delta$ is $$\Delta^2(u_i-u_j)^2+(v_i+v_j)^2>R_i^2$$

$$(u_j-\delta_1 u_i)^2+(vj_j-\delta_1 v_i)^2>R_i^2 \text{ and } (u_j-\delta_2 u_i)^2+(vj_j-\delta_2 v_i)^2>R_i^2$$

for all beams i, j simultaneously generated from the arrays.

To satisfy the above $\Delta$ conditions, the center of an adjacent beam must not fall within the beam squint boundary 40 of each of its adjacent beams.

The second method is a closer linear approximation of line 52 than that of method 1.

In a second method for determining the boundary equation for circular sidelobe radius, may be calculated as follows:

$R_0$=the angular radius of the desired sidelobe level, in radians, for any array beam steered at broadside $\beta$=linear slope of the bounding curve shown by the slope of line 50 of FIG. 5.

Single Beam's Sidelobe Radius:

$$R(\theta)=\sin^{-1}[(\beta-1)\sin(\theta)+\beta\sin(R_0)]$$

for R as an angle in radians. Actual (u,v) radius checked would be $$R_{uv}=[(\beta-1)\sin(\theta)+\beta\sin(R_0)].$$

Multiple Beam Pointing Check:

Beams i and j must be pointed to locations $(u_i, v_i)$ and $(u_j, v_j)$ such that:

$$\sin(\theta_j)=sqrt(u_i^2+v_i^2)$$

$$\sin(\theta_j)=sprt(u_j^2+v_j^2)$$

$$\sin(\theta_{max})=\max[\sin(\theta_i), \sin(\theta_j)]$$

$$R_{max}=[(\beta-1)\sin(\theta_{max})+\beta\sin(R_0)]$$

$$\Delta^2=(u_i-u_j)^2+(v_i-v_j)^2>R_{max}^2$$

for all beams i, j simultaneously generated from the arrays. $R_{max}$ corresponds to the beam scquint boundary.

An obvious extension of the above would be to incorporate the high/low frequency checks of the $\delta_1$.

Referring now to FIG. 5, a curve fit or lookup table may be used to more closely estimate the curve for $R(\theta)$. In the above examples, the relative distance is assumed to be a straight line having a slope a in the first example and a sloped D in the second example. As shown, line 52 represents the actual radius versus scan angle line. Line 52 illustrates that the actual radius is not a straight line but rather a curved line. That is, as the scan angle increases, the size of an adjacent beam does not increase linearly.

In the third method for determining $R(\theta)$, the onboard electronics may use a lookup table wherein information corresponding to line 52 is stored. By storing such a line, the $R_{max}$ value may be obtained from the Y axis for each scan angle. The $R_{max}$ value corresponds to the beam squint boundary.

Figure 6:
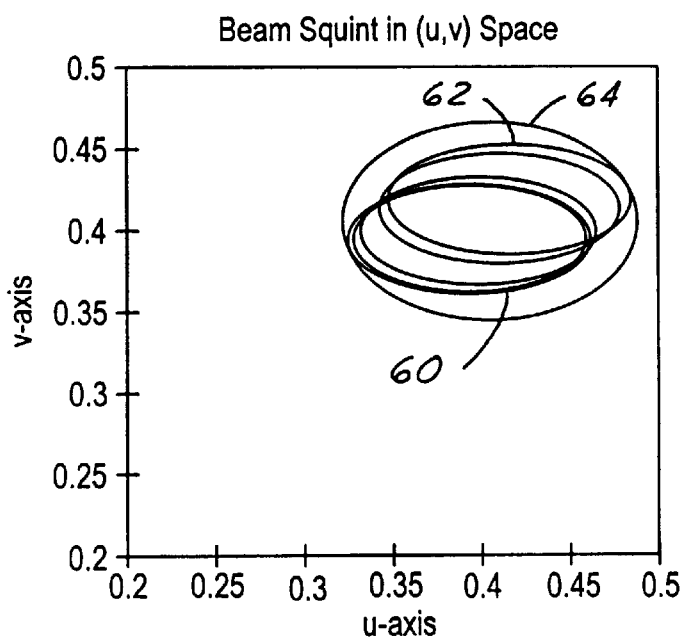
FIG. 6 is a plot of an elliptical beam squint boundary plotted at a 35° scan angle and having a derived beam squint boundary according to the present invention.

Referring now to FIG. 6, the, present invention also applies to an elliptical beam. That is, by pre-scaling the axes relative to each other, the circular checks described above may then be applied. For the example of FIG. 6, an ellipticity ratio of 2:1 is used. A low frequency contour 60 and a high frequency contour 62 are illustrated to represent the contours corresponding to the frequency bandwidth of the beam. A beam squint boundary 64 is used to enclose low frequency contour 60, high frequency contour 62, and the frequency contours therebetween.

To determine the acceptable spacing between beams, the following parameters are used:

$R_u$=the angular radius of the desired sidelobe level in the u-axis direction, in radians for an array beam steered at broadside $R_v$=the angular radius of the desired sidelobe level in the v-axis direction, in radians for an array beam steered at broadside $\epsilon_o$=ellipticity of the beam in (u, v) space, computed as $R_u/R_v$ $\gamma_o$=ellipticity adjustment factor, $\gamma_o=2-1/\epsilon_o$ if $\epsilon_o<2.62$, else $\gamma_o=\sqrt{\epsilon_o}$ if $\epsilon_o>2.62$ $R_o=R_u$ $\beta$=linear slope of the bounding curve Single Beam's Sidelobe Radius:

$$R(\theta)=\sin^{-1}[(\beta-1)\sin(\theta)+\beta\sin(R_0)]$$

for R as an angle in radians. Actual (u,v) radius checked would be $$R_{uv}=[(\beta-1)\sin(\theta)+\beta\sin(R_0)].$$

Multiple Beam Pointing Check:
Beams must be pointed to angles $\theta_i$ and $\theta_j$ such that:

$$\sin(\theta_i)=sqrt(u_i^2+v_i^2); \phi_i=a\tan(v_i/u_i)$$

$$\sin(\theta_j)=sqrt(u_j^2+v_j^2); \phi_j=a\tan(v_j/u_j)$$

$$R_i=[(\beta-1)\sin(\theta_i)+\beta\sin(R_0)]$$

$$R_j=[(\beta-1)\sin(\theta_j)+\beta\sin(R_0)]$$

Compute a new ellipticity factor for each beam as follows:

$$\gamma_i=\gamma_o|\sin(\phi i)|$$

$$\gamma_j=\gamma_o|\sin(\phi_j)|$$

$$\epsilon_i=[\epsilon_o(\beta-1)v_i+\epsilon_o\beta R_o]/[\epsilon_o(\beta-1)u_i+\gamma_i\beta R_o]$$

$$\epsilon_j=[\epsilon_o(\beta-1)v_j+\epsilon_o\alpha R_o]/[\epsilon_o+(\beta-1)u_j+\gamma_j\beta R_o]$$

Apply the following two checks, both must be satisfied:

$$(u_i-u_j)^2+(v_i-v)^2/\epsilon_i^2>R^2, \text{ and } (u_i-u_j)^2{}_j+(v_i-v_j)^2/\epsilon_j^2>R^2{}_j$$

Repeat for all beams i, j simultaneously generated from the arrays. The $\theta$ and $\phi$ angles, and the $\sin(\theta)$ and $\sin(\phi)$ values are available from the initial conversion to (u, v) coordinates and normally would not need to be recomputed as shown. $R_i$ and $R_j$ correspond to the beam squint boundaries for the adjacent beams.

In operation, each of the beams generated by the antenna are separated from the adjacent beams by a distance calculated according to the above equations to prevent interference between adjacent beams.

A first desired beam is determined that has a first desired center location, a first desired shape, a first beam angle, a first predetermined frequency band width comprising a first plurality of frequencies. A second desired beam is also determined that has a second desired center location, a second desired shape, a second beam angle, a second predetermined frequency band width comprising a plurality of frequencies. To prevent interference the beam centers must be space apart in a relation to the beam radius.

A first sidelobe radius corresponding to an acceptable sidelobe level for the first desired beam is determined. A second sidelobe radius corresponding to an acceptable sidelobe level for the second desired beam is also determined. Based on the sidelobe levels a first beam squint boundary and a second beam squint boundary are determined with respect to acceptable sidelobe levels. The beam squint boundary takes into consideration beam squint over the frequency range. A minimum acceptable spacing between the first beam and the second beam in response to the first beam squint boundary and the second beam squint boundary is determined. The first beam and the second beam may be generated a distance greater than or equal to said minimum acceptable spacing. All the beams of the satellite are preferably checked in a similar manner so that no two beams will interfere with each other.

While particular embodiments of the invention have been shown and described, numerous variations and alternate embodiments will occur to those skilled in the art. Accordingly, it is intended that the invention be limited only in terms of the appended claims.

What is claimed is:

1. A method of determining interference from a beam generated by a satellite comprising the steps of:
   determining a desired beam having a desired center location, a desired shape, a beam angle, a predetermined frequency band width comprising a plurality of frequencies;
   determining a sidelobe radius corresponding to an acceptable sidelobe level for the desired beam;
   determining a beam squint pattern corresponding to the frequency bandwidth;
   bounding said beam squint pattern with a beam squint boundary having an area substantially enclosing the beam squint pattern.

2. A method as recited in claim 1 wherein the step of bounding comprises the step of bounding the beam squint pattern with a beam squint boundary having an area substantially enclosing the beam squint pattern and having a radius greater than the sidelobe radius.

3. A method as recited in claim 1 wherein said step of determining a sidelobe radius comprises the step of determining a sidelobe radius corresponding to an acceptable sidelobe level for the desired beam is determined by a worst case sidelobe radius.

4. A method as recited in claim 1 wherein said step of determining a sidelobe radius comprises the step of determining a sidelobe radius corresponding to an acceptable sidelobe level for the desired beam is determined by a frequency-averaged radius.

5. A method for generating beams from an antenna having a plurality of antenna elements comprising the steps of:

determining at first desired beam having a first desired center location, a first desired shape, a first beam angle, a first predetermined frequency band width comprising a first plurality of frequencies;

determining a second desired beam having a second desired center location, a second desired shape, a second beam angle, a second predetermined frequency band width comprising a plurality of frequencies;

determining a first sidelobe radius corresponding to an acceptable sidelobe level for the first desired beam;

determining a second sidelobe radius corresponding to an acceptable sidelobe level for the second desired beam;

determining a first beam squint boundary and a second beam squint boundary;

determining a minimum acceptable spacing between the first beam having and the second beam in response to the first beam squint boundary and the second beam squint boundary;

positioning said first beam and said second beam a distance greater than or equal to said minimum acceptable spacing.

6. A method as recited in claim 5 wherein the step of determining a minimum acceptable spacing comprises the step of determining a spacing distance between the first beam center and a second beam center; and comparing the spacing distance to an acceptable beam spacing distance.

7. A method as recited in claim 6 wherein the steps of determining a first beam squint boundary and a beam squint boundary comprises the steps of:

determining a first beam squint pattern corresponding to said first frequency band width:

determining a second beam squint pattern corresponding to the first frequency band width;

bounding said first beam squint pattern with a beam squint boundary having a first area substantially enclosing the beam squint pattern; and bounding said first beam squint pattern with a beam squint boundary having a first area substantially enclosing the beam squint pattern.

8. A method as recited in claim 7 wherein the step of bounding comprises the step of bounding the beam squint pattern with a beam squint boundary having an area substantially enclosing the beam squint pattern and having a radius greater than the sidelobe radius.

9. A method as recited in claim 7 wherein said step of determining a sidelobe radius comprises the step of determining a sidelobe radius corresponding to an acceptable sidelobe level for the desired beam is determined by a worst case sidelobe radius.

10. A method as recited in claim 7 wherein said step of determining a sidelobe radius comprises the step of determining a sidelobe radius corresponding to an acceptable sidelobe level for the desired beam is determined by a frequency-averaged radius.

11. A satellite system comprising:

an antenna having a generating multiple beams;

a controller controlling the generation of a non-interfering beam pattern having a plurality of beams by determining a first sidelobe radius corresponding to an acceptable sidelobe level for a first desired beam and determining a second sidelobe radius corresponding to an acceptable sidelobe level for a second desired beam and determining a first beam squint boundary and a second beam squint boundary for each beam.

12. A satellite system as recited in claim 11 wherein said antenna is a phased array antenna.

13. A satellite system as recited in claim 11 wherein said beams have substantially identical shapes at all scan angles.

14. A satellite system as recited in claim 11 wherein said beams have shapes which vary as a function of scan angle.

15. A satellite system as recited in claim 11 wherein said first beam squint boundary comprises a plurality circles corresponding to a plurality of frequencies.

16. A satellite system as recited in claim 11 wherein said controller is time division multiplexed.

* * * * *